United States Patent [19]
Everdyke

[11] Patent Number: 5,595,336
[45] Date of Patent: Jan. 21, 1997

[54] SAFETY STAPLER

[75] Inventor: Wayne D. Everdyke, Fairport, N.Y.

[73] Assignee: Xerox Corporation, Stamford, Conn.

[21] Appl. No.: 551,600

[22] Filed: Nov. 1, 1995

[51] Int. Cl.$^6$ .................................................. B27F 7/36
[52] U.S. Cl. .............................. 227/7; 227/151; 227/156
[58] Field of Search ............................ 227/5, 6, 7, 156, 227/151, 152; 83/DIG. 1, 370, 372, 860, 544, 520, 521; 30/285, 295; 173/20

[56] References Cited

U.S. PATENT DOCUMENTS 5,094,379  3/1992  Hoyer et al. ................................ 227/2

Primary Examiner—Joseph J. Hail, III
Assistant Examiner—Jay A. Stelacone

[57] ABSTRACT

A safety system for a power stapler in which stapling of a set of sheets is actuated by inserting the set of sheets into the stapling jaws of the stapler, includes a large transparent upper plate mounted above the entrance to the stapling jaws and extending away from the stapling jaws by a distance greater than the length of a human finger, more than approximately 8 centimeters, and a lower plate below the entrance to the stapling jaws similarly extending, to prevent fingers from being inserted into the stapling jaws of the stapler. The upper and lower plates are spaced apart by a distance greater than the maximum thickness of the set of sheets to be stapled, to allow any set of sheets to be inserted into the stapling jaws from in between the upper and lower plates and be movable for alignment between the plates while being visible through the transparent upper plate. The plates may be pivotally mounted to the stapler so as to fold up into a compact vertical storage position closely adjacent to the stapler when not in use, in which position access to the stapling jaws is blocked.

2 Claims, 4 Drawing Sheets

SAFETY STAPLER

Disclosed is an improved stapler system with an improved user safety system for further protecting against accidental pinching or stapling of the fingers of operators holding a set of sheets to be inserted into the stapler to be stapled, especially with powered staplers which are automatically actuated by insertion of sheets into the open jaws of the stapler unit. In the disclosed embodiment there is shown a simple and low cost such user safety system which keeps user fingers away from the operating jaws of the stapler unit, yet does not interfere with insertion of the set of sheets to be stapled. Furthermore, this disclosed system does not obstruct the users view of the sheets being inserted, and thus does not interfere with selective operator alignment or angling of the set of sheets before the stapling, i.e., the selected position and angle of the staple position in the set being stapled, such as normal corner stapling. Additionally disclosed optional features include a space reducing pivotal storage position for the safety system.

By way of background as to staplers, especially electrically powered convenience staplers for the output of a copier or printer, and their desirability, as is all well known, there is noted, e.g., Xerox Corporation U.S. Pat. No. 5,094,379 issued Mar. 10, 1992 to August Hoyer, et al., and various other references cited therein. As noted therein, such solenoid driven electrically powered and automatically insertion switch actuated staplers for stapling up to 50 or 100 sheets sets, or more, are also widely commercially available. Well known commercial sources include the manufacturers for staplers, such as Max®, Swingline®, Bostich®, etc., staplers. Accordingly, such staplers and their operations need not be redescribed herein. The presently disclosed safety system can be provided with or applied to almost any such stapler, or other such set binding or finishing device.

A specific feature of the specific embodiment disclosed herein is to provide a safety system for a power stapler in which stapling of a set of sheets is actuated by inserting the set of sheets into the stapling jaws of the stapler, wherein said safety system comprises a large transparent upper plate mounted above the entrance to the stapling jaws of the stapler and extending away from the stapling jaws of the stapler by a distance greater than the length of a human finger, and a lower plate below the entrance to the stapling jaws of the stapler extending away from the stapling jaws of the stapler by a distance greater than the length of a human finger, to prevent fingers from being inserted into the stapling jaws of the stapler, said upper and lower plates being spaced apart by a distance greater than the maximum thickness of the set of sheets to be inserted into the stapling jaws of the stapler to allow the set of sheets to be insertable into the stapling jaws of the stapler from between said upper and lower plates and movable for alignment between said upper and lower plates while being visible through said transparent upper plate.

Further specific features provided by the specific embodiment disclosed herein, individually or in combination, include those wherein said transparent upper plate extends continuously for more than approximately 8 centimeters away from the stapling jaws of the stapler; and/or wherein said lower plate extends continuously for more than approximately 8 centimeters away from the stapling jaws of the stapler; and/or wherein at least said upper plate is pivotally mounted to said stapler to be pivotable into a compact vertical storage position closely adjacent to said stapler, in which position access to the stapling jaws is blocked.

In the description herein the term "sheet" or "copy sheet" refers to a usually flimsy physical sheet of paper, plastic, or other suitable physical substrate for printed images. A "set", "job" or "document" here is normally a compiled stacked set of related such sheets to be stapled together in one or more edge positions. Usually such a set is a collated copy set copied from a set of original document sheets or electronic document page images, from a particular user, or otherwise related. Or it can be an original plural page document which was unstapled to be copied, and the user wants to re-staple it together again after copying.

As to specific hardware components of the subject apparatus, or alternatives therefor, it will be appreciated that, as is normally the case, some such specific hardware components are known per se in other apparatus or applications which may be additionally or alternatively used herein, including those from art cited herein. All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus, the present invention will be better understood from this description of this embodiment thereof, including the drawing figure (approximately to scale) wherein:

Figure 1:
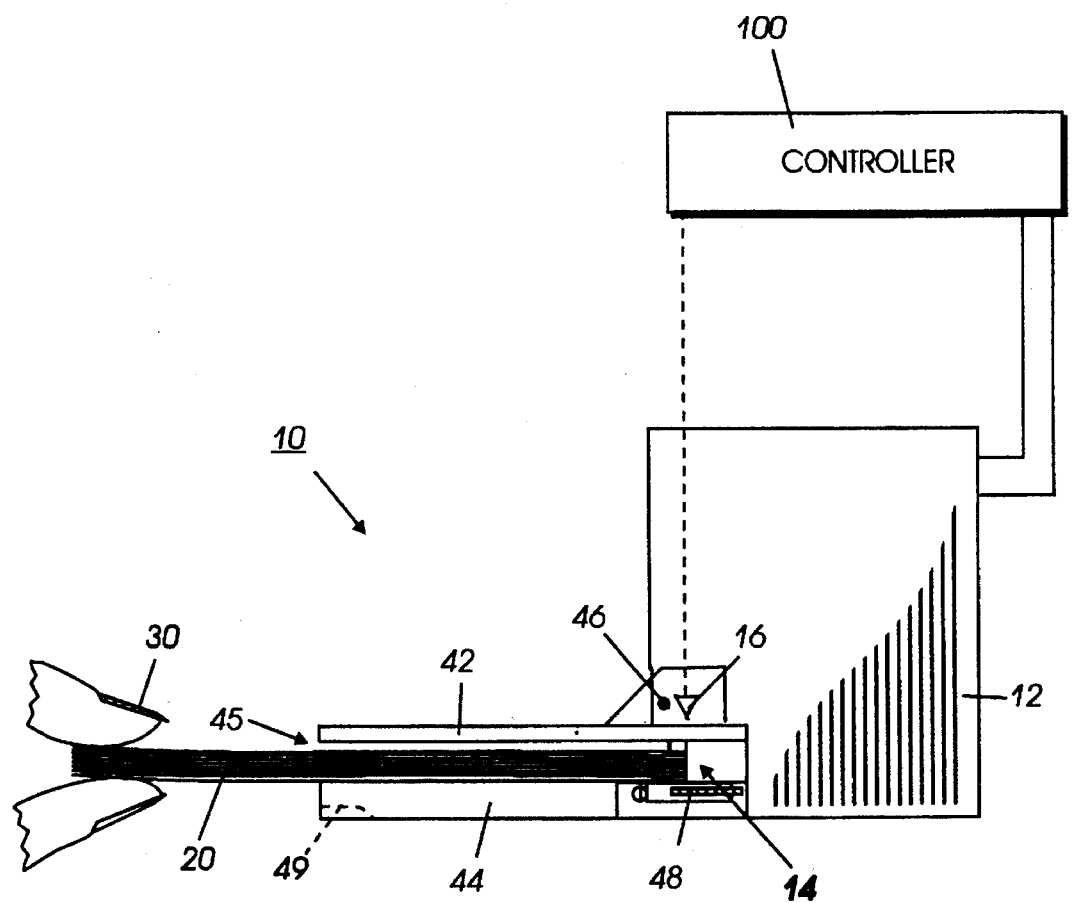
FIG. 1 is a schematic side view of one example of a powered stapler, with one example of the subject operator safety system thereon, and showing a portion of a set of sheets being inserted therein for stapling, along with a portion of a users fingers.
Figure 2:
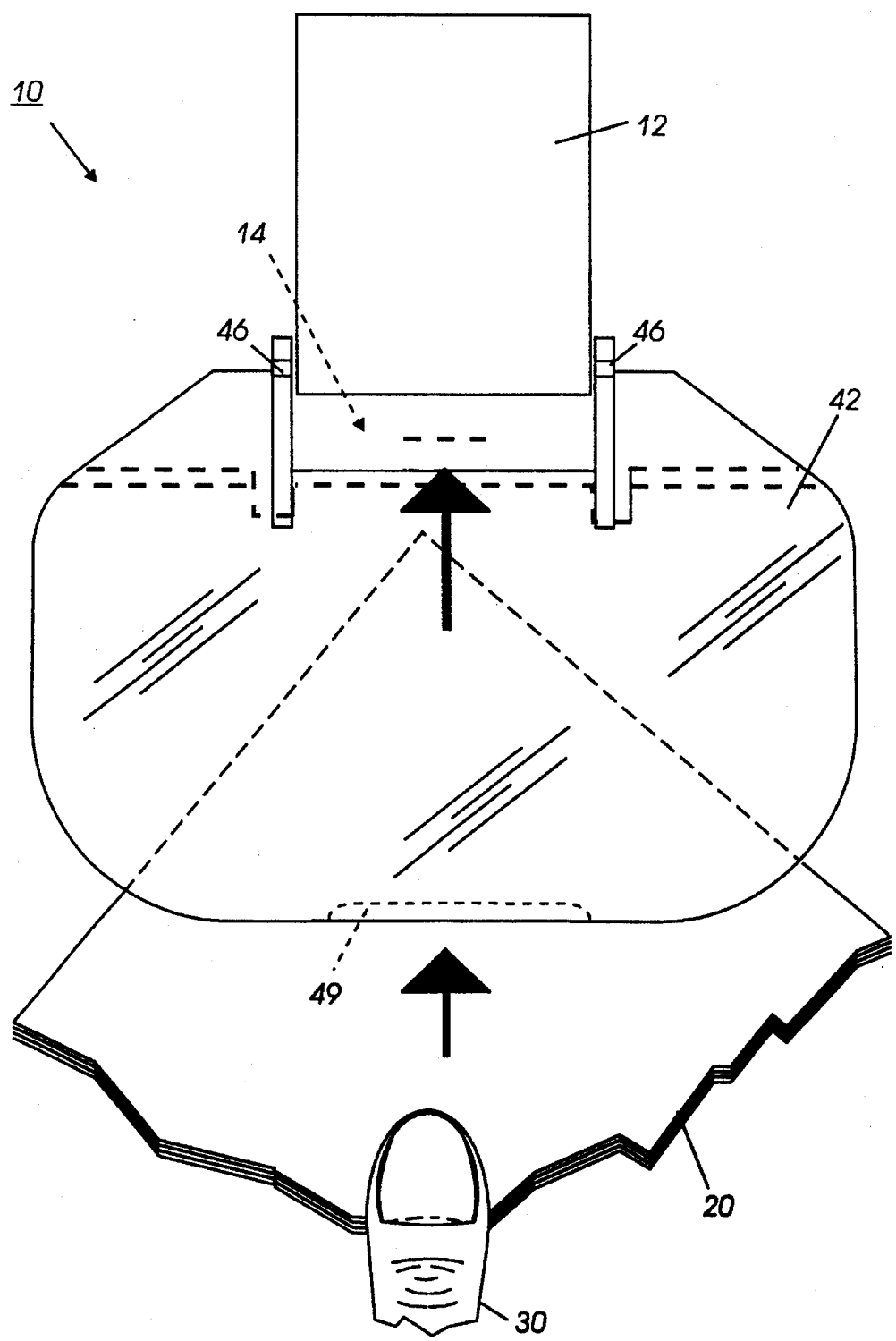
FIG. 2 is a top view of the embodiment of FIG. 1.

Referring further to the exemplary stapler safety system 10, there is schematically shown here a stapler 12, since almost any known power stapler 12 can incorporate this or some other version of the present safety system. The stapler desirably accommodates either insertion of the corner of a set inserted at about 45 degrees for corner stapling, or the insertion perpendicularly of one edge of the set for stapling along that edge. When the stapler 12 solenoid is actuated by an electrical pulse or signal from the controller 100, at least one side of the jaws 14 of the stapler 12 closes on the inserted set 20 to staple it. That stapler 12 power actuation may be conventionally triggered by a switch or sensor 16 in or closely adjacent to the stapler jaws 14, which switch or sensor 16 is normally actuated by sensing a leading edge of the set 20 of sheets being inserted for stapling. However, if a jaw opening into a stapler is large enough, e.g. a stapler with a 100 sheet or more set capacity, such as a so-called heavy duty stapler, and/or the operators finger is exceptionally small in diameter, in rare occasions a careless operator might carelessly insert his or her fingers 30 into the stapler jaw area and accidentally trigger its actuation. The stapler safety system 10 here is intended to prevent that.

Specifically, the stapler safety system 10 here comprises an opposing pair of large lips or bills formed by overlying spaced apart plates 42 and 44 extending outwardly from the stapler 12 jaws 14, through which the set 20 must be inserted to reach the jaws 14. The vertical spacing between the plates 42 and 44 is approximately the same as the jaws 14 opening, or even somewhat larger, so as not to obstruct access therethrough of even the largest (thickest) set 20 the stapler is capable of stapling.

Significantly, the horizontal extent of the plates 42, 44, especially the top plate 42, is longer than the fingers of an operator. That is, the plates 42, 44 extend by a distance out away from the the jaws 14 such that even if an operator tried to insert a finger in the open outer end 46 of the space between the plates 42, 44, the finger could not reach into the jaws 14 of the stapler. E.g., the plates 42, 44 desirably extend outwardly from the jaws 14 by several centimeters, as much as approximately 8 centimeters, or more. Thus, protection from the above situation is provided. It is the length, not the diameter, of fingers for which this safety device is configured. The system 10 makes use of the fact that sheets being stapled from or for a copier or printer are almost always longer than human fingers. Note also the illustrated rounded edges configurations of the plates 42, 44.

However, such a safety arrangement would not be acceptable if it interfered with correct or convenient stapling. Here, the upper plate 42 is transparent, so that the set 20 can still be seen and guided and controlled by the operator to be properly located in the stapler jaws 14, even though the entire forward portion of the set 20 is in between the plates 42, 44.

Figure 3:
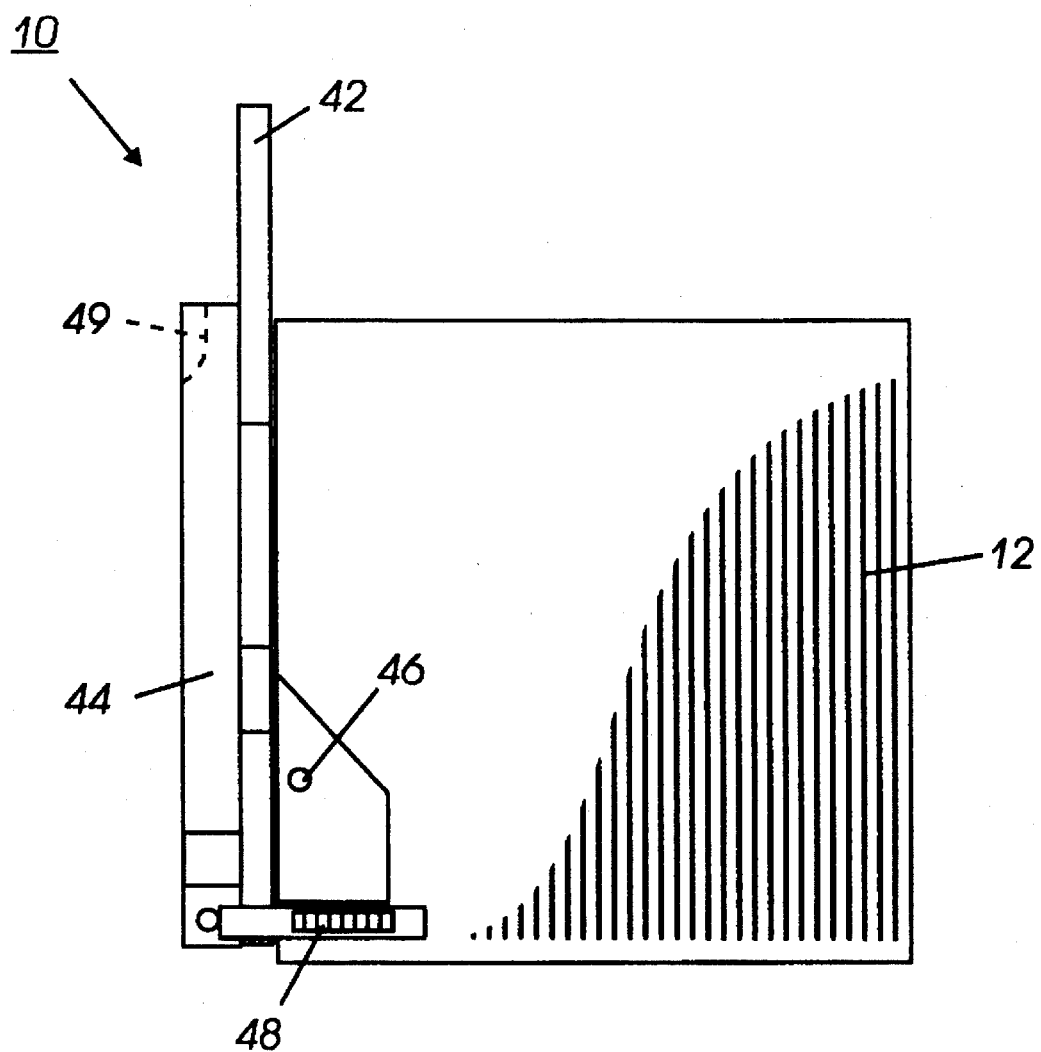
FIG. 3 is the same as FIG. 1, but shows a space reducing pivotal storage position for the safety system, which is pivoted up in this view.
Figure 4:
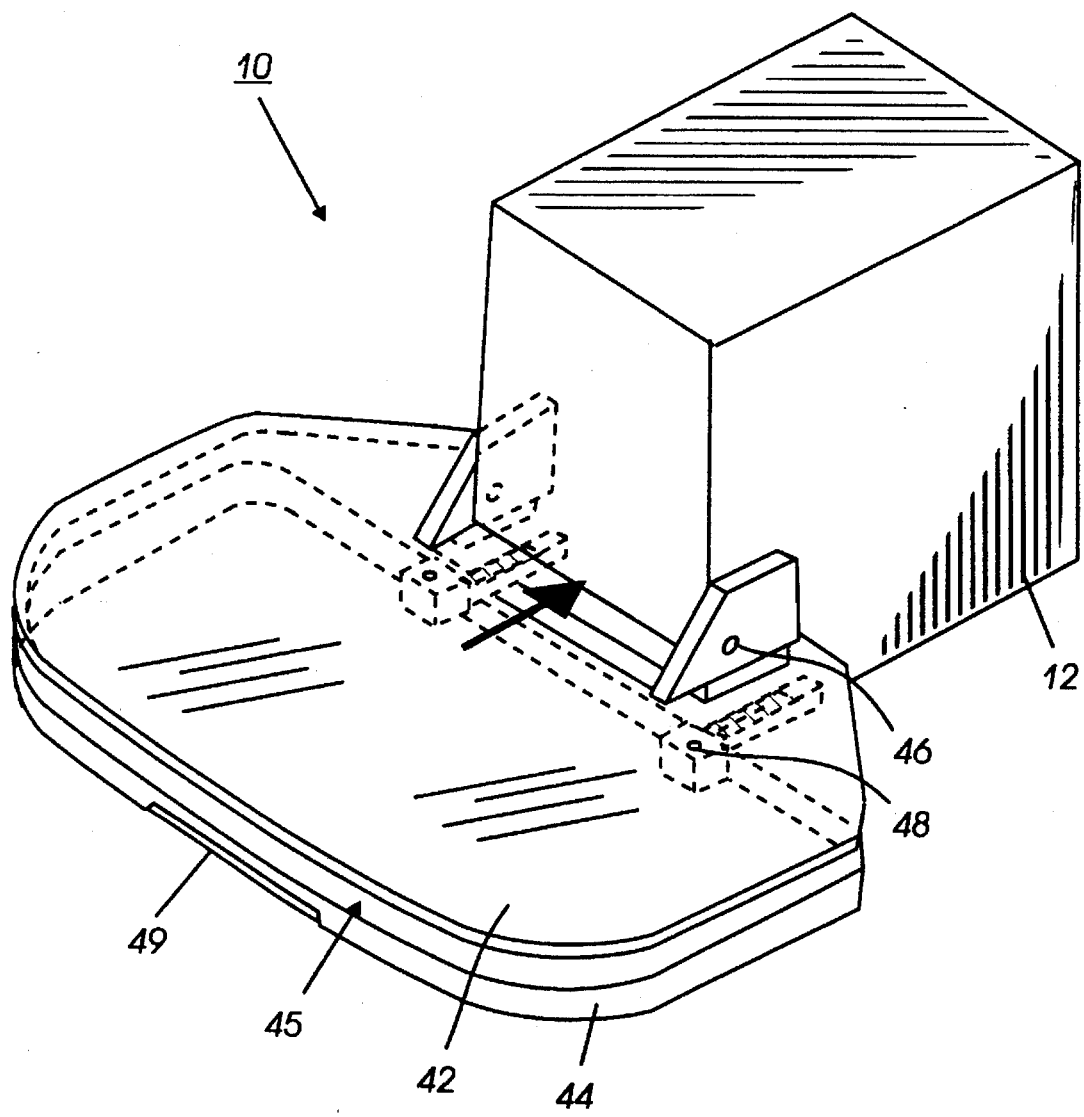
FIG. 4 is a perspective view.

As shown particularly in FIG. 3, the entire safety device 10 may be pivotally mounted to the front of the stapler 12, so as to be pivotable upwards into a space reducing pivotal storage position. Here in this example the upper transparent lid 42 is pivotally hinge mounted at 46, and the lower plate or platen 44 is pivotally hinge mounted at 48 with an overcenter spring or spring loaded slider hinge, so that when the operator grasps or lifts on a recessed hand grip 49 in the lower plate 44, both plates 42, 44 lift up together into a vertical position lying next to the front of the stapler 12, but blocking access to the jaws 14. Thus, the safety features are not removed by lifting away the safety system 10. That can of course be done for repairs by a repair person unfastening the described system 10 hinge mountings, but is not readily tamperable by the user or operator. The two plates 42 and 44 may be integral or fastened together at an area outside of and behind the jaws 14 so that the upper plate 42 cannot be lifted alone, i.e., without lifting the lower plate 44 therewith.

It will be appreciated that in some cases the lower plate 44 can be provided by a mounting base plate or surface to which the stapler 12 is mounted, providing it is below and leading to the entrance to the stapling jaws of the stapler. In that case only the upper plate 42 need be additionally provided. The upper plate 42 would still comprise a large transparent plate mounted above the entrance to the stapling jaws of the stapler and extending away from the stapling jaws of the stapler by a distance such that fingers cannot be inserted into the stapling jaws of the stapler.

While this invention has been described in conjunction with a specific embodiment thereof, many alternatives, modifications and variations will be apparent to those skilled in the art. It is intended to embrace all such alternatives, modifications and variations as fall within the true spirit and scope of the following claims:

What is claimed is:

1. A safety system for a power stapler with stapling jaws with a sheet entrance, in which stapling of a set of sheets of up to a maximum set thickness to be stapled of approximately 100 sheets is actuated by inserting the set of sheets into the stapling jaws of the stapler, wherein said safety system comprises a large transparent upper plate mounted above the entrance to the stapling jaws of the stapler and extending away from the stapling jaws of the stapler by at least approximately 8 centimeters, and a lower plate below the entrance to the stapling jaws of the stapler extending away from the stapling jaws of the stapler, and said upper and lower plates being spaced apart by a distance not subtantially greater than the maximum thickness of the set of sheets to be inserted into the stapling jaws of the stapler, to allow the set of sheets to be insertable into the stapling jaws of the stapler from between said upper and lower plates and movable for alignment between said upper and lower plates while being visible through said transparent upper plate yet prevent fingers from being inserted into the stapling jaws of the stapler.

2. A safety system for a power stapler with stapling jaws with a sheet entrance, in which stapling of a set of sheets of up to a preset maximum thickness is actuated by inserting the set of sheets into the stapling jaws of the stapler, wherein said safety system comprises a large transparent upper plate mounted above the entrance to the stapling jaws of the stapler and extending away from the stapling jaws of the stapler by at least approximately 8 centimeters, and a lower plate below the entrance to the stapling jaws of the stapler extending away from the stapling jaws of the stapler, to prevent fingers from being inserted into the stapling jaws of the stapler, said upper and lower plates being spaced apart by a distance not substantially greater than the maximum thickness of the set of sheets to be inserted into the stapling jaws of the stapler to allow the set of sheets to be insertable into the stapling jaws of the stapler from between said upper and lower plates and movable for alignment between said upper and lower plates while being visible through said transparent upper plate; wherein at least said upper plate is pivotally mounted to said stapler to be pivotable into a compact vertical storage position closely adjacent to said stapler, in which position access to the stapling jaws is blocked.

* * * * *